(12) United States Patent
Ishii

(10) Patent No.: US 7,885,225 B2
(45) Date of Patent: Feb. 8, 2011

(54) TRANSMISSION CONTROL METHOD OF DOWNLINK PACKET COMMUNICATION AND WIRELESS BASE STATION

(75) Inventor: Naoto Ishii, Tokyo (JP)

(73) Assignee: NEC Corporation, Tokyo (JP)

( * ) Notice: Subject to any disclaimer, the term of this patent is extended or adjusted under 35 U.S.C. 154(b) by 776 days.

(21) Appl. No.: 11/817,567

(22) PCT Filed: Feb. 21, 2006

(86) PCT No.: PCT/JP2006/302998

§ 371 (c)(1),
(2), (4) Date: Aug. 31, 2007

(87) PCT Pub. No.: WO2006/092976

PCT Pub. Date: Sep. 8, 2006

(65) Prior Publication Data

US 2009/0219855 A1  Sep. 3, 2009

(30) Foreign Application Priority Data

Mar. 2, 2005 (JP) .............................. 2005-057532

(51) Int. Cl.
*H04L 12/56* (2006.01)
*H04B 7/216* (2006.01)
(52) U.S. Cl. ..................... 370/328; 370/252; 370/430
(58) Field of Classification Search ................. 370/252, 370/328, 329, 430
See application file for complete search history.

(56) References Cited

U.S. PATENT DOCUMENTS 6,934,556 B2 * 8/2005 Takano ..................... 455/522
7,535,869 B2 * 5/2009 Yoon et al. ................. 370/329

FOREIGN PATENT DOCUMENTS

| JP | 2000-31396 A | 1/2000 |
| JP | 2004-64711 A | 2/2004 |
| JP | 2004-128993 A | 4/2004 |
| JP | 2004-173019 A | 6/2004 |
| JP | 2004-215254 A | 7/2004 |

OTHER PUBLICATIONS $3^{rd}$ Generation Partnership Project (3GPP) TS 25.214 V5.6.0, Sep. 2003, pp. 38-43.

* cited by examiner

*Primary Examiner*—John Pezzlo
(74) *Attorney, Agent, or Firm*—Sughrue Mion, PLLC

(57) ABSTRACT

A wireless base station for transmitting a data packet to a plurality of mobile stations through a downlink shared channel determines two powers to be allocated to the downlink shared channel using two large and small transmission power margins. The wireless base station carries out a step of relating a first transmission format, which applies a phase modulation or a phase-amplitude modulation to a data packet to be transmitted by an allocation power corresponding to the larger margin, to the mobile stations and a step of relating a second transmission format, which applies only the phase modulation to the data packet to be transmitted using the allocation power corresponding to the other margin, to the mobile stations, compares the total numbers of bits to be transmitted by the respective transmission formats, and transmits the data packet by the transmission format corresponding to a larger value. With this operation, the communication fault of an HSDPA due to the transmission power margins can be prevented.

19 Claims, 7 Drawing Sheets

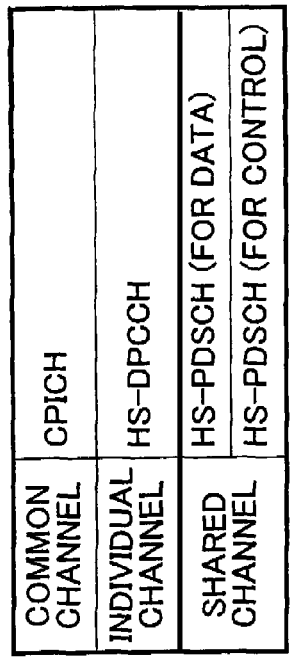
FIG.5
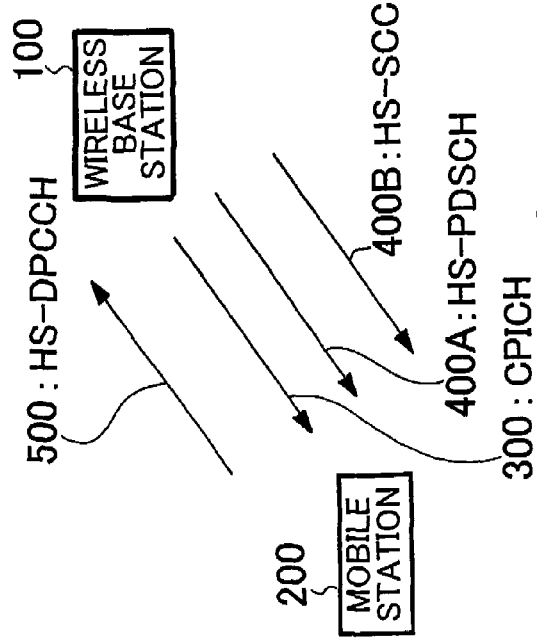
FIG.6
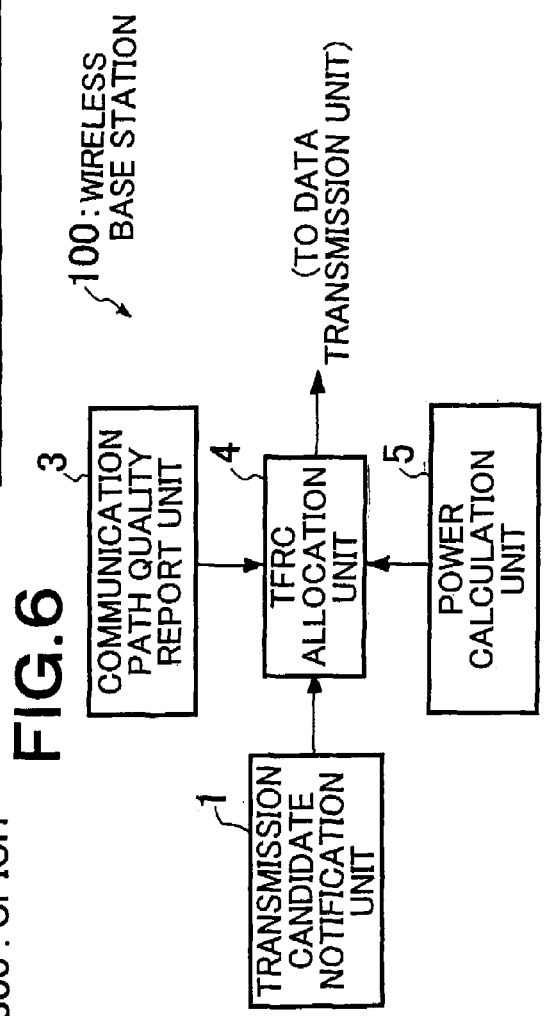

FIG.7

| CQI value | Transport Block Size | Number of HS-PDSCH | Modulation | Reference power adjustment Δ |
|---|---|---|---|---|
| 0 | N/A | Out of range | | |
| 1 | 137 | 1 | QPSK | 0 |
| 2 | 173 | 1 | QPSK | 0 |
| 3 | 233 | 1 | QPSK | 0 |
| 4 | 317 | 1 | QPSK | 0 |
| 5 | 377 | 1 | QPSK | 0 |
| 6 | 461 | 1 | QPSK | 0 |
| 7 | 650 | 2 | QPSK | 0 |
| 8 | 792 | 2 | QPSK | 0 |
| 9 | 931 | 2 | QPSK | 0 |
| 10 | 1262 | 3 | QPSK | 0 |
| 11 | 1483 | 3 | QPSK | 0 |
| 12 | 1742 | 3 | QPSK | 0 |
| 13 | 2279 | 4 | QPSK | 0 |
| 14 | 2583 | 4 | QPSK | 0 |
| 15 | 3319 | 5 | QPSK | 0 |
| 16 | 3565 | 5 | 16-QAM | 0 |
| 17 | 4189 | 5 | 16-QAM | 0 |
| 18 | 4664 | 5 | 16-QAM | 0 |
| 19 | 5287 | 5 | 16-QAM | 0 |
| 20 | 5887 | 5 | 16-QAM | 0 |
| 21 | 6554 | 5 | 16-QAM | 0 |
| 22 | 7168 | 5 | 16-QAM | 0 |
| 23 | 7168 | 5 | 16-QAM | -1 |
| 24 | 7168 | 5 | 16-QAM | -2 |
| 25 | 7168 | 5 | 16-QAM | -3 |
| 26 | 7168 | 5 | 16-QAM | -4 |
| 27 | 7168 | 5 | 16-QAM | -5 |
| 28 | 7168 | 5 | 16-QAM | -6 |
| 29 | 7168 | 5 | 16-QAM | -7 |
| 30 | 7168 | 5 | 16-QAM | -8 |

FIG.8

| CQI value | Transport Block Size | Number of HS-PDSCH | Modulation | Reference power adjustment Δ |
|---|---|---|---|---|
| 0 | N/A | Out of range | | |
| 1 | 137 | 1 | QPSK | 0 |
| 2 | 173 | 1 | QPSK | 0 |
| 3 | 233 | 1 | QPSK | 0 |
| 4 | 317 | 1 | QPSK | 0 |
| 5 | 377 | 1 | QPSK | 0 |
| 6 | 461 | 1 | QPSK | 0 |
| 7 | 650 | 2 | QPSK | 0 |
| 8 | 792 | 2 | QPSK | 0 |
| 9 | 931 | 2 | QPSK | 0 |
| 10 | 1262 | 3 | QPSK | 0 |
| 11 | 1483 | 3 | QPSK | 0 |
| 12 | 1742 | 3 | QPSK | 0 |
| 13 | 2279 | 4 | QPSK | 0 |
| 14 | 2583 | 4 | QPSK | 0 |
| 15 | 3319 | 5 | QPSK | 0 |
| 16 | 3319 | 5 | QPSK | -1 |
| 17 | 3319 | 5 | QPSK | -2 |
| 18 | 3319 | 5 | QPSK | -3 |
| 19 | 3319 | 5 | QPSK | -4 |
| 20 | 3319 | 5 | QPSK | -5 |
| 21 | 3319 | 5 | QPSK | -6 |
| 22 | 3319 | 5 | QPSK | -7 |
| 23 | 3319 | 5 | QPSK | -8 |
| 24 | 3319 | 5 | QPSK | -9 |
| 25 | 3319 | 5 | QPSK | -10 |
| 26 | 3319 | 5 | QPSK | -11 |
| 27 | 3319 | 5 | QPSK | -12 |
| 28 | 3319 | 5 | QPSK | -13 |
| 29 | 3319 | 5 | QPSK | -14 |
| 30 | 3319 | 5 | QPSK | -15 |

TRANSMISSION CONTROL METHOD OF DOWNLINK PACKET COMMUNICATION AND WIRELESS BASE STATION

This application is based upon and claims the benefit of priority from Japanese patent application No. 2005-057532, filed on Mar. 2, 2005, the disclosure of which is incorporated herein in its entirety by reference.

TECHNICAL FIELD

The present invention relates to a method for a wireless base station to transport a downlink packet based on the communication path quality reported from mobile stations in communication between the wireless base station and the mobile stations and more particularly to a transmission control method and a wireless base station according to a high speed downlink packet communication (hereinafter, referred to as "HSDPA" (High Speed Downlink Packet Access)) proposed by 3GPP (3rd Generation Partnership Project).

BACKGROUND ART

The communication channel of a cellular mobile communication system is broadly classified into three channels, that is, a common channel, an individual channel, and a shared channel. The wireless base station transmits information as to the cell of the base station itself to all the mobile stations existing in the cell in a predetermined transmission power using the common channel. Further, a packet is transmitted in the individual channel in a power that varies as a time passes under a high speed closed loop type transmission power control so that the respective mobile stations satisfy predetermined communication quality. The shared channel is a channel for carrying out a packet communication by switching a plurality of mobile stations to a high speed. The transmission control of the shared channel is standardized as HSDPA by 3GPP, which is disclosed in, for example, Non-Patent Document 1 to be described later in detail.

FIG. 5 shows channels using the HSDPA between a wireless base station 100 and a mobile station 200. Although an example of FIG. 5 shows the one mobile station (200) for the convenience of explanation, it is assumed that even if a plurality of mobile stations exist, channels similar to those shown in FIG. 5 exist to the respective mobile stations. FIG. 5 shows a CPICH (Common Pilot Channel) 300 as a common channel, further shows an HS-PDSCH (High Speed Physical Downlink Shared Channel) 400A for transmitting data and an HS-SCCH (High Speed Shared Control Channel) 400B for transmitting control information as a shared channel used to HSDPA, and further shows, as an individual channel, an HS-DPCCH (High Speed Dedicated Physical Control Channel: individual control channel) 500 that is used by the mobile station to notify the wireless base station of a CQI (Channel Quality Indicator) which shows the communication path quality thereof.

According to the regulation of the HSDPA, the powers, which are obtained by subtracting the respective powers of the common channel and the individual channel from the maximum transmission power of the wireless base station 100, are allocated to HSDPA allocation powers which are the transmission powers allocated to the HS-PDSCH 400A and the HS-SCCH 400B. In the allocation, an average power in a predetermined period is used in place of the instant power of the individual channel in consideration of a high speed transmission power control in the individual channel. Further, to compensate the time-variation of the individual channel, the allocation is carried out after a transmission power margin is previously secured from the maximum transmission power. With this operation, it can be prevented that a power exceeding the maximum transmission power of the wireless base station 100 is allocated to the HSDPA allocation power.

A value, which is obtained by adding an offset to the power of a DL-DPCH (Download Dedicated Physical Channel: downlink individual channel), which is a pair with the HS-DPCCH 500 from the mobile station 200, is used as the transmission power of the HS-SCCH 400B for transmitting the control information in the shared channel. On the other hand, the transmission power of the HS-PDSCH 400A for transmitting data is determined by subtracting the transmission power of the HS-SCCH 400B from the allocation power of the HSDPA described above. However, the average value of an HS-SCCH power, which is a value obtained by adding an offset to the average value of the DL-DPCH, is ordinarily used as the power of the HS-SCCH 400B used at the time in consideration that the mobile station 200 in the cell is switched to a high speed.

Further, according to the regulation of the HSDPA, the wireless base station 100 selects a TFRC (Transport Format Resource Combination), which is a transmission format composed of a modulation type used to the HS-PDSCH 400A, the number of dispersion codes, and the number of information bits, using the HSDPA allocation power and the CQI reported from the mobile station 200 at each time at which a packet is transmitted and transmits data to the mobile station 200 based on the selected TFRC. The wireless base station 100 selects the TFRC using a correspondence table recommended in Non-Patent Document 1 and described below.

FIG. 6 shows an arrangement of the wireless base station 100 having a function for selecting the TFRC. FIG. 6 shows a part of a function in the wireless base station. In FIG. 6, a transmission candidate notification unit 1 notifies a TFRC allocation unit 4 of a mobile station to which data must be transmitted from the HSDPA. If a plurality of mobile stations exist as transmission candidates, the order in which TFRC is allocated to the respective mobile stations is also determined and notified at the same time. A power calculation unit 5 calculates an HS-PDSCH power 3 that can be used at the time and notifies the TFRC allocation unit 4 of it. A communication path quality notify unit 3 notifies the TFRC allocation unit 4 of the CQI obtained by the transmission candidate notification unit 1 from the mobile station. The TFRC allocation unit 4 selects the TFRC and allocates it to the respective mobile stations notified from the transmission candidate notification unit 1 in the notified order using the CQI and the HS-PDSCH power and notifies a data transmission unit (not shown) of the allocated TFRC.

A method of calculating the CQI, which is notified to the wireless base station by the mobile station, is disclosed in Non-Patent Document 1. That is, the mobile station measures the power of the CPICH 300 received from the wireless base station and newly predicts an HS-PDSCH power using the ratio of the measured power and the previously notified HS-PDSCH power. Further, the mobile station calculates an SIR (Signal to Interference Ratio) that is a receiving level when an HS-PDSCH packet is received based on the predicted HS-PDSCH power and searches a CQI which satisfies the previously determined SIR and has the largest number of transport bits from a previously prepared correspondence table of the TFRC and the CQI.

FIGS. 7 and 8 show an example of the correspondence table of the TFRC and the CQI. It is assumed that the correspondence table used by the mobile station is common to the correspondence table described above which is used by the wireless base station 100 to select the TFRC. FIGS. 7 and 8 are composed of the same items, respectively, and when, for example, FIG. 7 is referred to, a transport block size 7b, the number of HS-PDSCH codes 7c, a modulation type 7d, and a reference power adjustment value 7e are related to a CQI value 7a. Note that the correspondence table of FIG. 7 employs "QPSK" (Quadrature Phase Shift Keying: phase modulation) or "16-QAM" (16 Quadrature Amplitude Modulation: phase-amplitude modulation) as the modulation type, and the correspondence table of FIG. 8 employs only the "QPSK" as the modulation type. The mobile station reports the CQI value selected from the correspondence table as shown above to the wireless base station using the HS-DPCCH 500.

The wireless base station 100 selects the TFRC using the CQI from the mobile station as explained with reference to FIG. 6. However, since the HS-PDSCH power is varied by the variation of the number of individual channels, an error occurs between the HS-PDSCH power used by the mobile station to calculate the CQI and the HS-PDSCH power which can be used when the CQI reaches the wireless base station. To cope with this problem, the wireless base station corrects the error contained in the CQI from the mobile station using the ratio of the HS-PDSCH power previously notified to the mobile station and the HS-PDSCH power that can be allocated at the time and selects the TFRC from the correspondence table as shown in FIG. 7 using the corrected CQI.

Non-Patent Document 1: 3GPP, "3GPP TS25.214ver5.6.0 (2003-9)", [online], September, 2003 (searched on Feb. 28, 2005) <http://www.3gpp.org/ftp/Specs/archive/25_series/25.214/25214-560.zip>

DISCLOSURE OF THE INVENTION

If, for example, the correspondence table shown in FIG. 7 is used as a correspondence table for selecting the TFRC of the downlink packet, the wireless base station 100 can employ not only the QPSK but also the 16-QAM as the modulation type. However, if data is transmitted using the 16-QAM which permits a high speed communication, since a relatively high accuracy is required in a data modulation process, high linearity is required particularly to a power amplifier used when a base band signal is converted into an RF signal. Accordingly, if a power amplifier of the wireless base station 100 does not have high quality, it is necessary to restrict the input power of the base band signal to maintain the linearity of the output from the amplifier.

To restrict the input power of the base band signal in the wireless base station 100, it is sufficient to make, for example, the maximum transmission power of the wireless base station equal to the maximum input power of the power amplifier which satisfies the linearity. This is equivalent to use the difference between the maximum transmission power of the wireless base station and the maximum input power of the power amplifier which satisfies the linearity as the transmission power margin described above. Accordingly, when the linearity of the power amplifier is taken into consideration, a relatively large value is set to the transmission power margin.

Incidentally, when the number of the mobile stations 200 making communication with the wireless base station 100 increases, since a power necessary to individual channels is increased, the HSDPA allocation power is reduced thereby. However, when the transmission power margin at the time is set in consideration of the linearity of the power amplifier, it is more difficult to secure the HSDPA allocation power because the margin is relatively large. Thus, the wireless base station selects a TFRC having a low transport capability in conformity with a small HSDPA allocation power, from which a problem arises in that communication quality is deteriorated because a communication speed is lowered. Further, if the communication quality is outstandingly deteriorated, there is a possibility that communication by the HSDPA is stopped.

An object of the present invention, which was made in view of the above problems, is to provide a method of preventing a communication fault caused by the transmission power margin an HSDPA.

A transmission control method according to the present invention is a method by which a wireless base station, which transmits a data packet to a plurality of mobile stations sending communication quality information through an uplink individual channel of a wireless line, through a downlink shared channel carries out a step of determining a first allocation power of the downlink shared channel using a first transmission power margin, a step of determining a second allocation power of the downlink shared channel using a second transmission power margin smaller than the first transmission power margin, a step of relating a first transmission format, which is a transmission format for transmitting the data packet using the first allocation power as well as applying a phase modulation or a phase-amplitude modulation to the data packet according to the first allocation power, to the mobile stations, a step of relating a second transmission format, which is a transmission format for transmitting the data packet using the second allocation power as well as applying only the phase modulation to the data packet, to the mobile stations and a step of comparing a total number of transport bits to be transmitted by the first transmission format with a total number of transport bits to be transmitted by the second transmission format and transmitting the data packet by a transmission format corresponding to a larger value of the total numbers.

In a wireless base station according to the present invention transmitting a data packet to a plurality of mobile stations, which send communication quality information through an uplink individual channel of a wireless line, through a downlink shared channel, the wireless base station comprises a means for determining a first allocation power of the downlink shared channel using a first transmission power margin, a means for determining a second allocation power of the downlink shared channel using a second transmission power margin smaller than the first transmission power margin, a means for relating a first transmission format, which is a transmission format for transmitting the data packet using the first allocation power as well as applying a phase modulation or a phase-amplitude modulation to the data packet according to the first allocation power, to the mobile stations, a means for relating a second transmission format, which is a transmission format for transmitting the data packet using the second allocation power as well as applying only the phase modulation to the data packet, to the mobile stations, and a means for comparing a total number of transport bits to be transmitted by the first transmission format with a total number of transport bits to be transmitted by the second transmission format and transmitting the data packet by a transmission format corresponding to a larger value of the total numbers.

EFFECT OF THE INVENTION

According to the present invention, data as much as possible can be transmitted to the mobile stations by adaptively switching the transmission power margins and carrying out an equivalent control. With this operation, since communication to the mobile stations can be continued, the communication fault of an HSDPA can be avoided.

BRIEF DESCRIPTION OF THE DRAWINGS

FIG. 5 is an explanatory view of channels used in HSDPA;

FIG. 6 is a block diagram showing an arrangement of a conventional wireless base station;

FIG. 7 is an explanatory view explaining a TFRC; and

FIG. 8 is an explanatory view explaining the TFRC.

Figure 1:
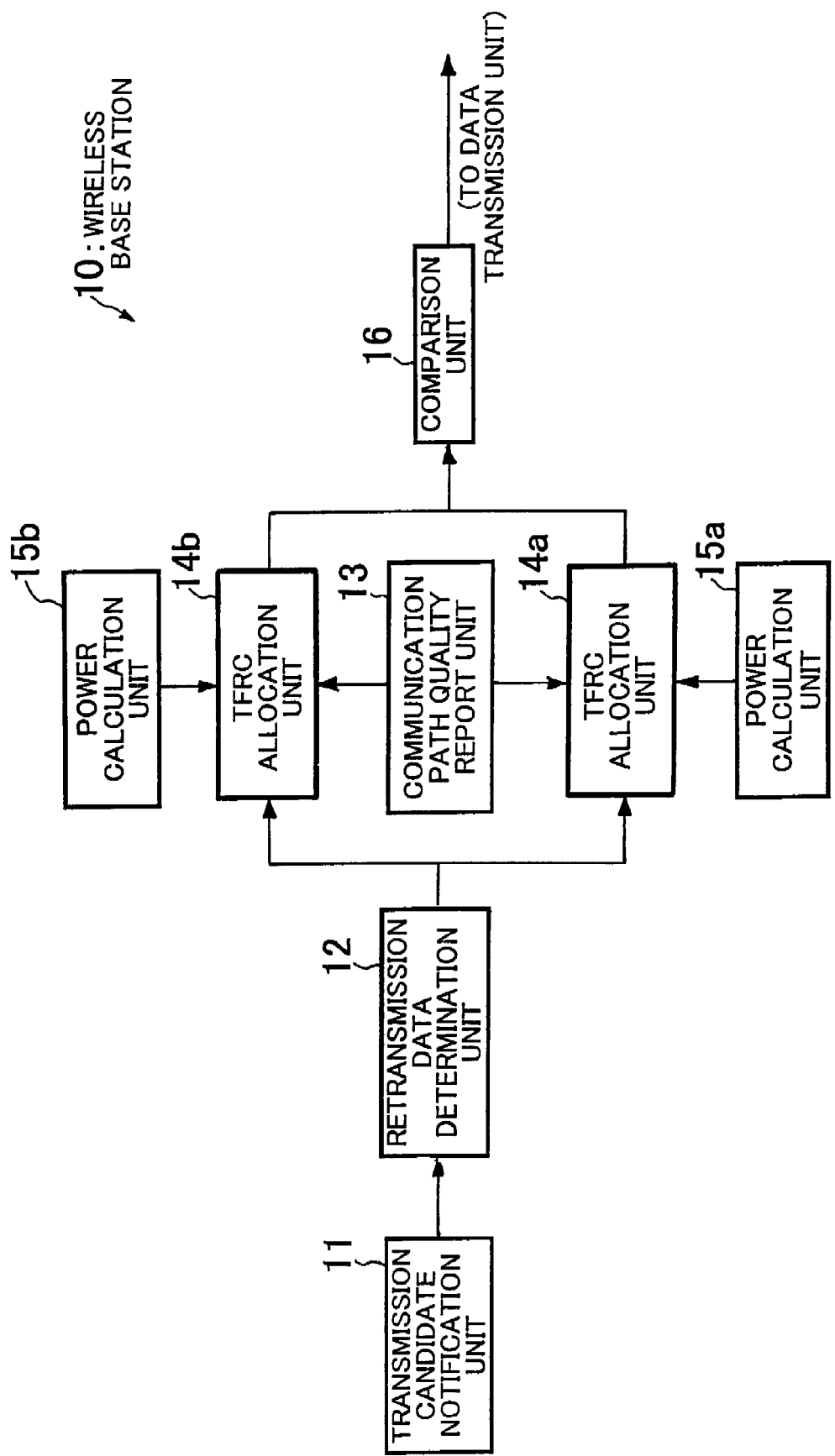
FIG. 1 is a block diagram showing an arrangement of an embodiment a wireless base station according to the present invention.

DESCRIPTION OF REFERENCE NUMERALS 10 wireless base station
11 transmission candidate notification unit
12 retransmission data determination unit
13 communication path quality report unit
14a, 14b TFRC allocation unit
15a, 15b power calculation unit
16 comparison unit

BEST MODE FOR CARRYING OUT THE INVENTION

An embodiment of the present invention will be explained below in detail using the drawings. FIG. 1 is a block diagram showing an arrangement of a wireless base station according to the present invention. The arrangement shown in FIG. 1 corresponds to a part of a functional arrangement in a wireless base station 10 of the embodiment. Specifically, FIG. 1 shows a functional arrangement for selecting a TFRC that is a transmission format to be applied to a shared channel of an HSDPA.

A transmission candidate notification unit 11 achieves a function similar to that of the transmission candidate notification unit 1 in the conventional wireless base station 100 shown in FIG. 6. The transmission candidate notification unit 11 notifies a retransmission data determination unit 12 of a mobile station nominated as a candidate to which a data packet is transmitted and the priority order of the candidate at each time at which data is transmitted. The priority order of the mobile station prescribes a mobile station to which transmission is preferentially carried out as well as indicates the order in which a TFRC to be described later is allocated. A higher priority order may be set to a mobile station from which a better CQI is reported or it may set at random. However, the priority order is set separately to retransmission mobile stations which transmit data to be retransmitted and to new mobile stations which transmit new data. Further, a priority order higher than that of the new mobile stations is set to the retransmission mobile stations.

The retransmission data determination unit 12 determines whether the transmission candidate notified from the transmission candidate notification unit 11 is any of the retransmission mobile station and the new mobile station and notifies TFRC allocation units 14a and 14b to be described later of a transmission candidate according to a result of the determination.

A communication path quality report unit 13 achieves the same function as that of the conventional communication path quality report unit 3 shown in FIG. 6 and achieves a function for notifying the TFRC allocation units 14a and 14b of the CQI reported from the mobile station.

A power calculation unit 15a and a power calculation unit 15b achieve functions for calculating an HSDPA allocation power and an HS-PDSCH power using transmission power margins having a different magnitude. The power calculation unit 15a corresponds to a means for calculating a first allocation power in the present invention, the power calculation unit 15b corresponds to a means for calculating a second allocation power, and a transmission power margin smaller than that of the power calculation unit 15a is set to the power calculation unit 15b.

The TFRC allocation units 14a and 14b relate the TFRC and the HS-PDSCH power to the mobile station notified from the retransmission data determination unit 12, respectively. The TFRC allocation unit 14a corresponds to a means for relating a first transmission format in the present invention to the mobile station, and the TFRC allocation unit 14b corresponds to a means according to a second transmission format.

The TFRC allocation unit 14a refers to a correspondence table as shown in FIG. 7 in which the QPSK and the 16-QAM exist as a modulation type, selects a TFRC suitable to a target mobile station from the correspondence table, and relates it to the mobile station. Then, the TFRC allocation unit 14a allocates the HS-PDSCH power corresponding to the related TFRC from HS-PDSCH power calculated by the power calculation unit 15a, that is, from the HS-PDSCH power calculated using a large transmission power margin. The TFRC allocation unit 14b on the other hand allocates the HS-PDSCH power of a target mobile station from the HS-PDSCH power calculated by the power calculation unit 15b using a smaller transmission power margin using a correspondence table as shown in FIG. 8 in which only the QPSK exists. The TFRC allocation units 14a and 14b calculate the total number of transport bits to the respective mobile stations subjected to the allocation processing, respectively and notifies a comparison unit 16 of a result of the calculation.

The comparison unit 16 achieves a function for comparing the total number of the transmission bits of the two systems notified from the TFRC allocation units 14a and 14b and notifying a data transmission unit (not shown) of the TFRC to be applied at the timing of transmission of this time.

Figure 2:
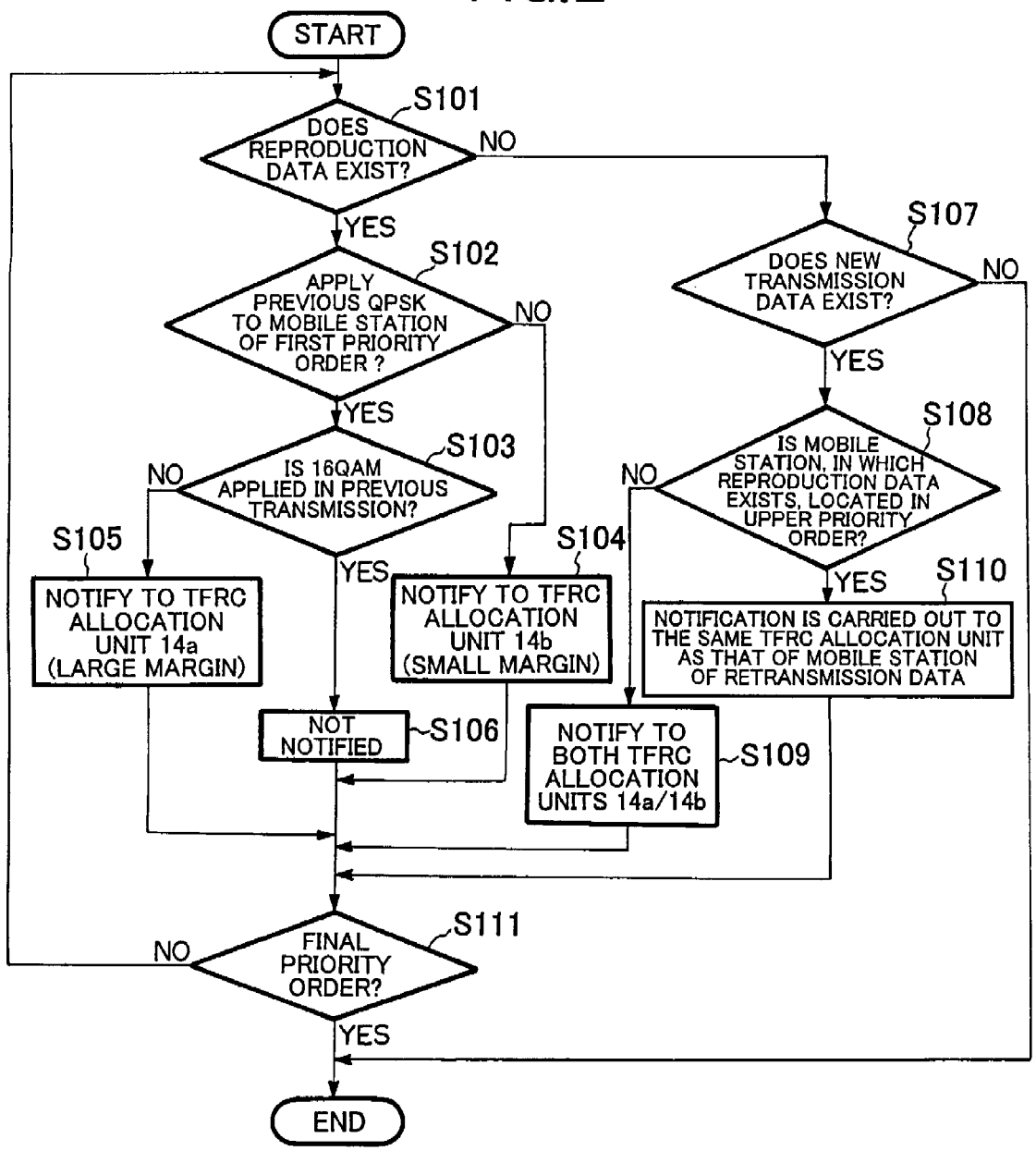
FIG. 2 is a flowchart of a retransmission data determination unit in the embodiment.

An operation procedure of the retransmission data determination unit 12 will be explained with reference to a flowchart shown in FIG. 2. First, the retransmission data determination unit 12 determines whether a target the mobile station is any of the retransmission the mobile stations and the new the mobile stations according to the priority order notified from the transmission candidate notification unit 11. If the target mobile station is a retransmission the mobile station (S:101: Yes), the retransmission data determination unit 12 determines whether or not the QPSK was applied to the retransmission mobile station, which has a first priority order this time, in the previous data transmission. If the 16-QAM was applied to the retransmission mobile station having the first priority order in place of the QPSK (S102: No), the retransmission data determination unit 12 indicates the TFRC allocation unit 14b, to which a result of the calculation carried out by the power calculation unit 15b using the small transmission power margin is applied, to relate the TFRC to the target mobile station (S104).

If the QPSK was applied to the retransmission mobile station having the first priority order (S102: Yes), the retransmission data determination unit 12 notifies the TFRC allocation unit 14a, to which a result of the calculation carried out by the power calculation unit 15a using the large transmission power margin is applied, of a target retransmission mobile station (S105). However, if the 16-QAM was applied to the target retransmission mobile station in the previous data transmission, any of the TFRC allocation units is not notified of the target mobile station at the timing of transmission of this time (S106).

The retransmission data determination unit 12 repeats the above procedure until the processing of the retransmission mobile station having a lowest priority order is finished (S111). With this operation, the notification as to the retransmission mobile station is carried out to any one of the TFRC allocation units 14a and 14b, and further to which of them the notification is carried out is specified by the modulation type applied last time to the retransmission mobile station having the first priority order this time.

On the other hand, if a new mobile station exists in the transmission candidates notified from the transmission candidate notification unit 11 (S107: Yes), the retransmission data determination unit 12 determines whether or not a retransmission mobile station exists in the transmission candidates having a priority order higher than that of the new mobile station. If no retransmission mobile station exists in the transmission candidates (S108: No), that is, the transmission candidates at the timing of transmission of this time are only new mobile stations, the retransmission data determination unit 12 indicates both the TFRC allocation units 14a and 14b to allocate the TFRC to a target new mobile station (S109). Further, if a retransmission mobile station exits in the transmission candidates (S108: Yes), notification is carried out to the same TFRC allocation unit (1) as that to which notification is carried out as to the retransmission mobile station (S110). The retransmission data determination unit 12 carries out notification as to all the new mobile stations in the procedure described above (S111).

The communication path quality report unit 13 notifies the TFRC allocation units 14a and 14b of the CQI as to the mobile stations notified by the retransmission data determination unit 12, respectively.

The power calculation units 15a and 15b determine the HSDPA allocation power and the HS-PDSCH power by a calculation procedure explained below using the transmission power margins set thereto, respectively. It is assumed that when a "suffix (i)" is "(a)" in the following explanation, it shows a value used by the power calculation unit 15a, whereas when the "suffix (i)" is "(b)", it shows a value used by the power calculation unit 15b.

When the maximum transmission power of the wireless base station 100 is shown by "Pmax", the average power of the common channel and the individual channel is shown by "Pnhp", and the transmission power margin is shown by "Pmargin(i)", the HSDPA allocation power "Phsdpa(i)" is defined as described below. Note that "MAX(x,y)" shows that a larger one of "x" and "y" is to be selected.

$Phsdpa(i)=MAX(Pmax-Pnhp-Pmargin(i), 0)$ $Pmargin(a)>Pmargin(b)$ where, the difference between "Pmargin(b)" and "Pmargin(a)" is set to the same value as the difference between the maximum transmission power of the wireless base station 100 and the maximum input power thereof that can satisfy the linearity of a power amplifier.

Further when the average power of a DPCH (individual channel) is shown by "Pdpch" and the power offset of the HS-SCCH to the DPCH is shown by "Δoffset", the HS-PDSCH power "Pdsch(i)" notified by the power calculation unit (15) to the TFRC allocation unit (14) is determined as described below.

$Pdsch(i)=Phsdpa(i)-Pdpch \times \Delta offset$

Accordingly, the HS-PDSCH power "Phsdpa(b)" notified to the TFRC allocation unit 14b is set to a value equal to or larger than the HS-PDSCH power "Phsdpa(a)" notified to the TFRC allocation unit 14a. Both the units have the same value only when both the values are set to "0".

Figure 3:
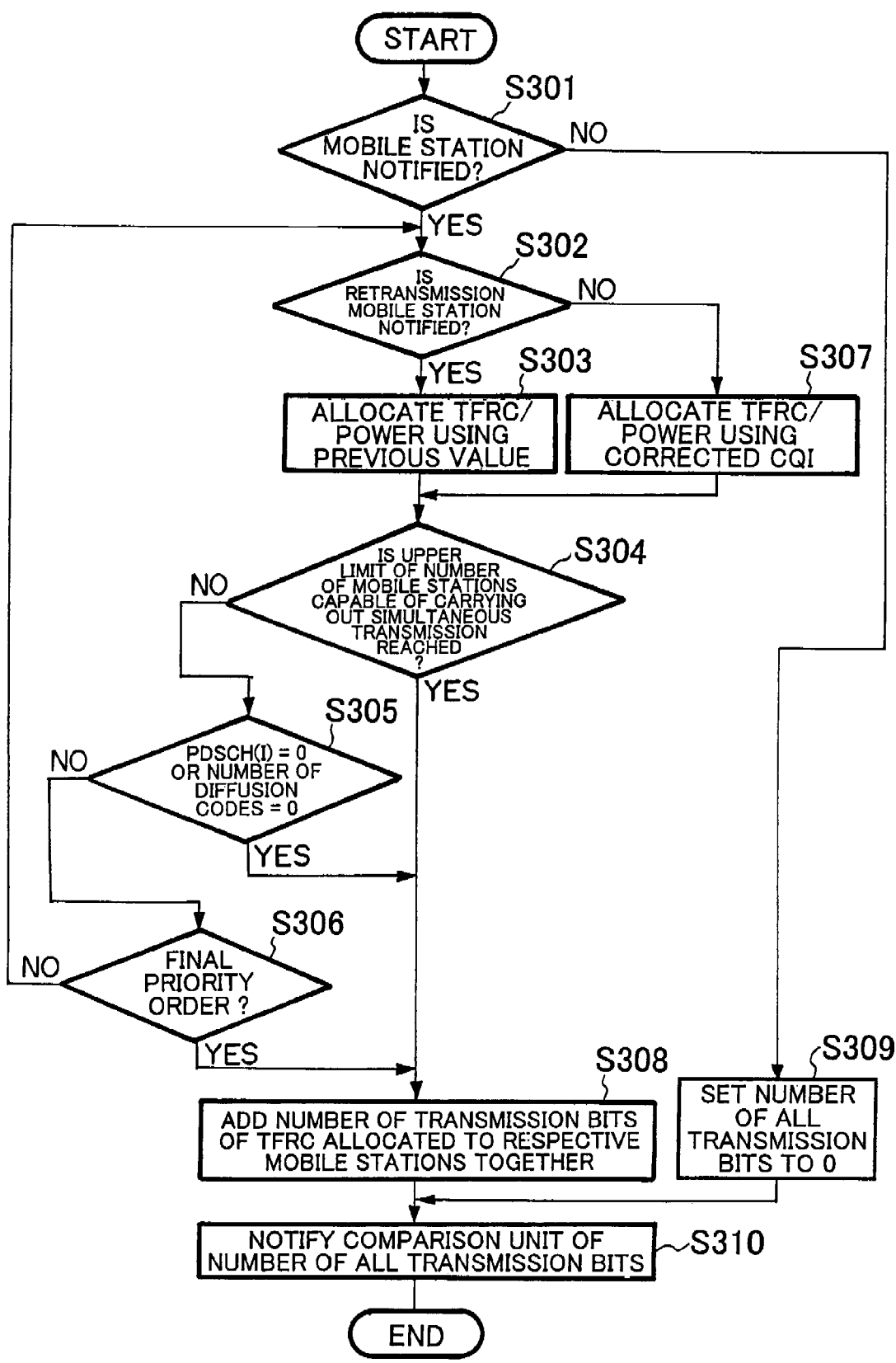
FIG. 3 is a flowchart of a TFRC allocation unit in the embodiment.

The TFRC allocation units 14a and 14b select the TFRCs of the mobile stations, which are notified from the retransmission data determination unit 12, respectively, from the correspondence table, and allocate the HS-PDSCH power for the target mobile station from the HS-PDSCH power calculated by the power calculation unit 15a or 15b. An operation procedure of the TFRC allocation unit (14) will be explained below with reference to a flowchart shown in FIG. 3. Note that a suffix "(i)" is the same as that explained in the power calculation unit (15) described above.

When the TFRC allocation unit (14) receives a notification as to a mobile station from the retransmission data determination unit 12 (S301: Yes), the TFRC allocation unit (14) determines whether it is any of a retransmission mobile station and a new mobile station. If it is the retransmission mobile station (S302: Yes), the TFRC allocation unit (14) applies the same TFRC and the same HS-PDSCH power as those applied in the previous data transmission to the retransmission mobile station and allocates the applied HS-PDSCH power to the HS-PDSCH power determined by the power calculation unit (15) (S303). That is, the same value as the previous HS-PDSCH power of the retransmission mobile station is secured from the "Pdsch (i)" calculated by the power calculation unit (15). If the "Pdsch(i)" is a value which does not satisfy the previous HS-PDSCH power, the "Pdsch (i)" is processed as the HS-PDSCH power of the retransmission mobile station.

Unless the number of the allocated transmission mobile stations reaches the number of mobile stations, to which transmission can be simultaneously carried out, at the timing of transmission of this time (S304: No), the TFRC allocation unit (14) continues the processing until any of the remaining amount of allocation of the "Pdsch(i)" and the number of codes which can be allocated to the HS-PDSCH becomes "0" (S305: No). Note that when the wireless base station 100 starts, a previously set value is used as the number of the mobile stations to which transmission can be simultaneously carried out.

If a new mobile station is notified from the retransmission data determination unit 12 after the above processing as to the retransmission mobile station is finished, (S302: No), the CQI reported from the mobile station is corrected using the ratio of the "Pdsch(i)" and the previously notified HS-PDSCH power, and the TFRC of the corrected CQI is obtained from the correspondence table in the same manner as the conventional manner (S307). Then, unless the number of the mobile stations processed up to that time reaches the number of the mobile stations, to which transmission can be simultaneously carried out, (S304: No), the TFRC allocation unit (14) continues the processing until any of the remaining amount of allocation of the "Pdsch(i)" and the number of codes which can be allocated to the HS-PDSCH becomes "0" (S305: No).

When the number of the mobile stations, to which transmission can be simultaneously carried out, is reached (S304: Yes) or any of the remaining amount of allocation of the "Pdsch(i)" and the number of codes which can be allocated to the HS-PDSCH becomes "0" (S305: Yes), the TFRC allocation unit (14) adds the number of bits of the data to be transmitted the respective mobile station together (S308) and notifies the comparison unit 16 of a result of the addition as the total number of bits to be transmitted (S310). Note that, if no notification of the mobile stations is transmitted from the retransmission data determination unit 12 to the mobile stations at the timing of transmission of this time (S301: No), "0" is notified as the total number of bits to be transmitted (S309).

Figure 4:
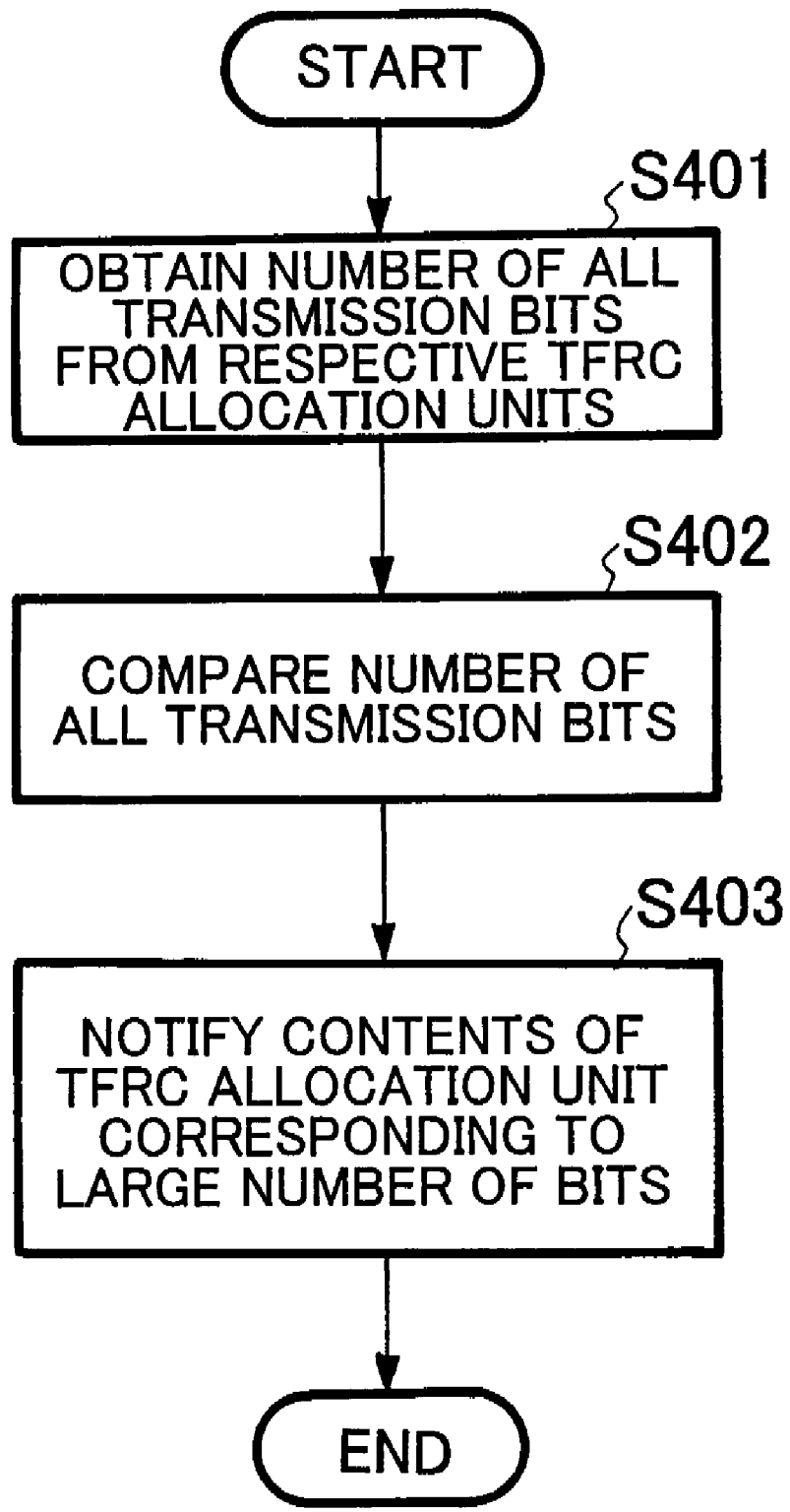
FIG. 4 is a flowchart of a comparison unit in the embodiment.

FIG. 4 shows an operation procedure of the comparison unit 16. When the comparison unit 16 obtains the total numbers of bits to be transmitted from the TFRC allocation units 14a and 14b (S401), the comparison unit 16 compares them (S402) and specifies a TFRC allocation unit (14) corresponding to a larger value. Then, the comparison unit 16 indicates a data transmission unit (not shown) to transmit a data packet using the contents allocated by the specified TFRC allocation unit (14) and finishes the processing.

Note that although the new mobile station is notified to both the TFRC allocation units 14a and 14b as described above as to the notification of the transmission candidate, the retransmission mobile station is notified to any one of the TFRC allocation units (14). Accordingly, if a retransmission mobile station exists in target mobile stations, the TFRC allocation unit (14), which is notified of the retransmission mobile station, inevitably has the larger total number of bits to be transmitted. Further, if the transmission candidates are only new mobile stations, the magnitude relation between the total numbers of bits to be transmitted between the respective TFRC allocation units (14) is changed by the modulation type of the TFRC obtained by the CQIs corrected by the respective TFRC allocation units (14).

If the contents of allocation of the TFRC allocation unit 14a is notified by the comparison unit 16, the data packet to the respective mobile stations is transmitted by the power which takes the characteristics of the power amplifier into consideration after they are modulated by the QPSK or the 16-QAM. Because the TFRCs, which applied to the respective mobile stations, are selected based on the HS-PDSCH power determined after a large transmission power margin ("Pmargin(a)") is previously secured.

On the other hand, if the contents of the TFRC allocation unit 14b are notified, only the QPSK is applied to the data packets to the respective mobile stations. However, since the 16-QAM, which must take the power amplifier into consideration because a high speed communication is employed, is not used, a transmission power margin ("Pmargin(b)") smaller than that of the TFRC allocation unit 14a is set as the transmission power margin. Therefore, even if only the QPSK is applied, a large amount of power can be secured from the maximum transmission power of the wireless base station 100 to transmit the data packet.

According to the embodiment described above, the TFRCs of the two systems are allocated to the mobile stations based on the two transmission power margins having a different magnitude, and a data packet is transmitted using the TFRC of the system having a high transmission speed. Thus, data as much as possible can be transmitted to the mobile stations acting as the transmission candidates. As described above, since communication to the mobile stations can be continued by adaptively switching the transmission power margins and carrying out an equivalent control, the communication fault of the HSDPA can be avoided.

Although the QPSK and the 16-QAM are used as the data modulation type in the embodiment, a phase modulation and a phase-amplitude modulation of other standard may be used when the present invention is embodied. BPSK (Binary Phase Shift Keying), for example, may be used as the phase modulation in place of the QPSK, and further 64-QAM may be used as the phase-amplitude modulation in place of the 16-QAM.

Although the exemplary embodiments of the present invention have been described in detail, it should be understood that various changes, substitutions and alternatives can be made therein without departing from the sprit and scope of the invention as defined by the appended claims. Further, it is the inventor's intent to retrain all equivalents of the claimed invention even if the claims are amended during prosecution.

The invention claimed is:

1. A transmission control method, characterized in that a wireless base station, which transmits a data packet to a plurality of mobile stations sending communication quality information through an uplink individual channel of a wireless line, through a downlink shared channel carries out:

a step of determining a first allocation power of the downlink shared channel using a first transmission power margin;

a step of determining a second allocation power of the downlink shared channel using a second transmission power margin smaller than the first transmission power margin;

a step of relating a first transmission format, which is a transmission format for transmitting the data packet using the first allocation power as well as applying a phase modulation or a phase-amplitude modulation to the data packet according to the first allocation power, to the mobile stations;

a step of relating a second transmission format, which is a transmission format for transmitting the data packet using the second allocation power as well as applying only the phase modulation to the data packet, to the mobile stations; and a step of comparing a total number of transport bits to be transmitted by the first transmission format with a total number of transport bits to be transmitted by the second transmission format and transmitting the data packet by a transmission format corresponding to a larger value of the total numbers.

2. A transmission control method according to claim 1, characterized in that the wireless base station carries out a step of determining priority order of the mobile stations to which the data packet is to be transmitted and relates the transmission formats to the mobile stations according to the priority order.

3. A transmission control method according to claim 2, characterized in that the wireless base station sets the priority order of retransmission mobile stations which transmit data to be retransmitted ahead of that of new mobile stations which transmit new data and relates any one of the first and second transmission formats to the retransmission mobile stations.

4. A transmission control method according to claim 3, characterized in that the wireless base station relates the same transmission format as that related to the retransmission mobile stations to the new mobile stations.

5. A transmission control method according to claim 3, characterized in that if the wireless base station has applied the phase modulation to a previous transmission format of a retransmission mobile station having the first priority order, the wireless base station relates the first transmission format to the retransmission mobile station to be related to the first or second transmission format.

6. A transmission control method according to claim 3, characterized in that if the wireless base station has applied the phase modulation to a previous transmission format of a retransmission mobile station having the first priority order as well as applies the phase-amplitude modulation to a previous transmission format of the retransmission mobile station to be related to the first or second transmission format, the wireless base station does not relate a transmission format to the retransmission mobile station to be related to the first or second transmission format.

7. A transmission control method according to claim 3, characterized in that if the wireless base station has applied the phase-amplitude modulation to a previous transmission format of a retransmission mobile station having the first priority order, the wireless base station relates the second transmission format to the retransmission mobile station to be related to the first or second transmission format.

8. A transmission control method according to claim 2, characterized in that if a retransmission mobile station which transmits data to be retransmitted does not exist, the wireless base station relates both the first and second transmission formats to new mobile stations which transmit new data.

9. A transmission control method according to any one of claims 1 to 8, characterized in that the wireless base station uses QPSK (Quadrature Phase Shift Keying) as the phase modulation and uses 16-QAM (16 Quadrature Amplitude Modulation) as the phase-amplitude modulation.

10. A wireless base station transmitting data packets to a plurality of mobile stations, which send communication quality information through an uplink individual channel of a wireless line, through a downlink shared channel, comprising:
    means for determining a first allocation power of the downlink shared channel using a first transmission power margin;
    means for determining a second allocation power of the downlink shared channel using a second transmission power margin smaller than the first transmission power margin;
    means for relating a first transmission format, which is a transmission format for transmitting the data packet using the first allocation power as well as applying a phase modulation or a phase-amplitude modulation to the data packet according to the first allocation power, to the mobile stations;
    means for relating a second transmission format, which is a transmission format for transmitting the data packet using the second allocation power as well as applying only the phase modulation to the data packet, to the mobile stations; and
    means for comparing a total number of transport bits to be transmitted by the first transmission format with a total number of transport bits to be transmitted by the second transmission format and transmitting the data packet by a transmission format corresponding to a larger value of the total numbers.

11. A wireless base station according to claim 10, further comprising means for determining priority order of the mobile stations to which the data packet is to be transmitted, wherein and the transmission formats are related to the mobile stations according to the priority order.

12. A wireless base station according to claim 11, characterized in that the wireless base station sets the priority order of retransmission mobile stations which transmit data to be retransmitted ahead of that of new mobile stations which transmit new data and relates any one of the first and second transmission formats to the retransmission mobile stations.

13. A wireless base station according to claim 12, characterized in that the wireless base station relates the same transmission format as that related to the retransmission mobile stations to the new mobile stations.

14. A wireless base station according to claim 12, characterized in that if the wireless base station has applied the phase modulation to a previous transmission format of a retransmission mobile station having the first priority order, the wireless base station relates the first transmission format to the retransmission mobile station to be related to the first or second transmission format.

15. A wireless base station according to claim 12, characterized in that if the wireless base station has applied the phase modulation to a previous transmission format of a retransmission mobile station having the first priority order as well as applies the phase-amplitude modulation to a previous transmission format of the retransmission mobile station to be related to the first or second transmission format, the wireless base station does not relate a transmission format to the retransmission mobile station to be related to the first or second transmission format.

16. A wireless base station according to claim 12, characterized in that if the wireless base station has applied the phase-amplitude modulation to a previous transmission format of a retransmission mobile station having the first priority order, the wireless base station relates the second transmission format to the retransmission mobile station to be related to the first or second transmission format.

17. A wireless base station according to claim 11, characterized in that if a retransmission mobile station which transmits data to be retransmitted does not exist, the wireless base station relates both the first and second transmission formats to new mobile stations which transmit new data.

18. A wireless base station according to any one of claims 10 to 17, characterized in that the wireless base station uses QPSK (Quadrature Phase Shift Keying) as the phase modulation and uses 16-QAM (16 Quadrature Amplitude Modulation) as the phase-amplitude modulation.

19. In a wireless base station transmitting data packets to a plurality of mobile stations, which send communication quality information through an uplink individual channel of a wireless line, through a downlink shared channel, a computer readable medium storing a program of computer executable instructions causing a computer to perform as the wireless base station according to any one of claims 10 to 17.

* * * * *